April 16, 1940.  J. E. BARTH  2,197,676
ADVERTISING ATTACHMENT FOR LICENSE PLATES
Filed July 18, 1939
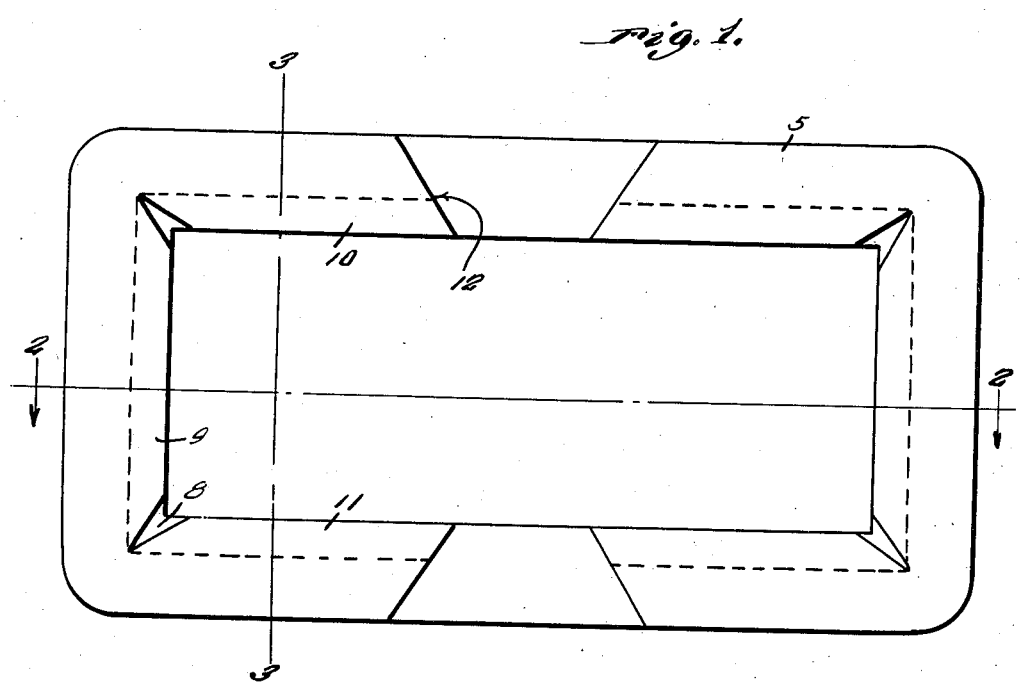
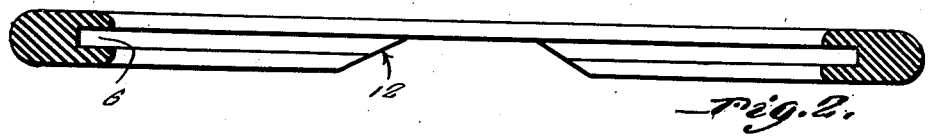
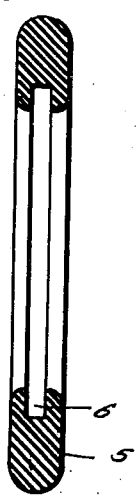
Inventor
J. E. Barth
By Clarence A. O'Brien
and Hyman Berman
Attorneys Patented Apr. 16, 1940

2,197,676

UNITED STATES PATENT OFFICE 2,197,676

ADVERTISING ATTACHMENT FOR LICENSE PLATES

Joseph E. Barth, Sarasota, Fla.

Application July 18, 1939, Serial No. 285,156

2 Claims. (Cl. 40—125)

The present invention relates to attachment for automobile license plates and has for its primary object to provide an open frame, preferably constructed of rubber and adapted to be fitted about the marginal edges of the license plate to protect the same and also to provide space for inserting suitable advertising matter.

A further object is to provide an attachment of this character adapted to be easily applied to the edges of the license plate without interference by the usual attaching brackets for the plate, and which at the same time is neat and attractive in appearance, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1 is a rear elevational view.

Figure 2 is a sectional view taken substantially on a line 2—2 of Figure 1.

Figure 3 is a vertical sectional view taken substantially on a line 3—3 of Figure 1.

Figure 4 is a front elevational view showing the device in position on a license plate.

Referring now to the drawing in detail, the numeral 5 denotes an open frame preferably constructed of rubber, and having an internal groove or channel 6 formed on the inner peripheral edge of the frame and within which the edges of the license plate 7 are adapted to be inserted.

In order to facilitate the insertion of the edges of the plate in the groove 6 the inner corners of the frame, at the rear surface thereof, are notched or cut out in a substantially V-form, as shown at 8, to provide end flaps 9 and longitudinal upper and lower flaps 10 and 11 extending around the inner marginal edges of the frame and adapted to be individually bent outwardly to facilitate the insertion of the edges of the plate in the channel 6 in a manner as will be apparent.

The top and bottom sections of the frame, at the rear faces thereof, are also provided with notches or cut out portions 12 having oppositely inclined edges to conform to the conventional type of license plate supporting brackets (not shown) and in which notches the bracket is adapted to seat to prevent interference of the bracket with the insertion of the edges of the plate in the groove or channel 6.

The front surface of the frame 5 provides space for the carrying of suitable advertising matter such as shown at 13.

It is believed the details of construction and manner of use of the device will be readily understood from the foregoing without further detailed explanation.

Having thus described the invention, what I claim is—

1. An attachment for license plates comprising an open resilient rectangular frame having a groove extending around its inner periphery for receiving the marginal edges of the plate, said frame further having portions of its rear surface removed to provide aligned notches extending from the outer edge to the inner edge thereof for exposing a portion of said license plate and receiving a support when attached to said exposed portion of said license plate.

2. An attachment for license plates comprising an open resilient rectangular frame having a groove extending around its inner periphery for receiving the marginal edges of the plate, said frame further having portions of its rear surface removed to provide aligned notches extending from the outer edge to the inner edge thereof for exposing a portion of said license plate and receiving a support when attached to said exposed portion of said license plate, and flaps adjacent said aligned notches to be flexed to permit the insertion of said plate in said groove.

JOSEPH E. BARTH.